Sept. 1, 1964 M. DREYER 3,146,746
MULTIPLE WALLED CORRUGATED TUBING
Filed Dec. 5, 1960
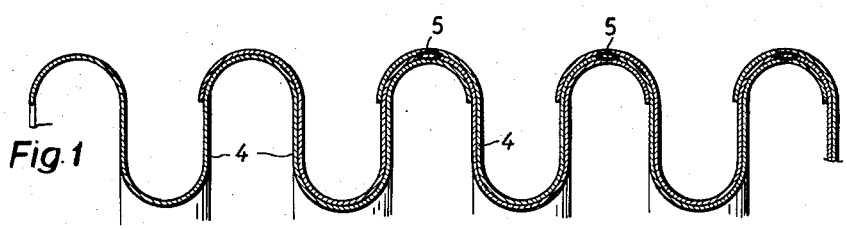
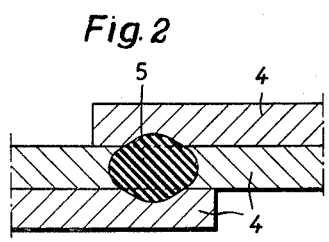
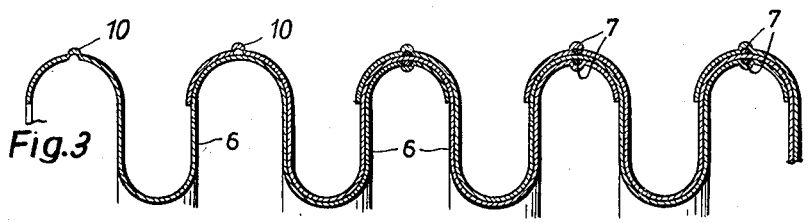
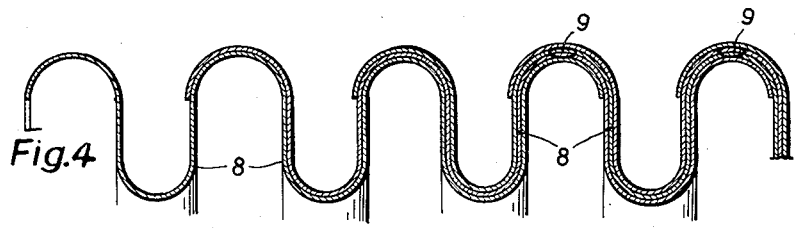

United States Patent Office 3,146,746
Patented Sept. 1, 1964

3,146,746
MULTIPLE WALLED CORRUGATED TUBING
Marco Dreyer, Lucerne, Switzerland, assignor to Metallschlauchfabrik, A.G., Lucerne, Switzerland
Filed Dec. 5, 1960, Ser. No. 74,091
Claims priority, application Switzerland Dec. 4, 1959
1 Claim. (Cl. 113—35)

The present invention relates to a method of producing a corrugated pipe of multiple thickness.

A double or multiple walled corrugated pipe in comparison to a single walled pipe provides a much higher compression strength with the same wall thickness of the individual layers. When the wall thickness of a single walled corrugated pipe is increased, so that either it withstands the same pressure as a double or multiple walled pipe, or the single wall is equally thick as the combined wall thickness of the double or multiple walled pipe, then the mobility and flexibility of the single walled corrugated pipe is reduced relative to the double or multiple walled pipe. The double or multiple walled corrugated pipe therefore is mainly used for high pressure fluids which also may be at high temperatures and where a high flexibility is required at the same time. Such possibilities of use are for example movable conduits, wherein vibrations or sudden pressure fluctuations occur. These requirements are more and more imposed, particularly in the construction of vehicles, airplanes and rockets. Such conduits have to meet very high standards with respect to mobility, pressure and oscillations.

The method according to the invention for producing a double or multiple walled corrugated pipe consists in winding a single corrugated metal band of a width extending over a plurality of corrugations in such a manner that the band overlaps itself by a plurality of corrugations. This method enables to corrugate and also to wind and, if desired, to weld the metal band in one operation on a single fully automatic machine. According to this method corrugated pipes of any desired lengths can be produced. The length is only limited by the length of the available bands which, however, if required, could also be welded together.

It is an object of the present invention to form a double or multiple walled corrugated pipe by a single profiled band wound in such manner as to prevent communication between the inside and the outside of the pipe when a leak occurs at a welding point.

The method according to the invention will now be described with reference to the accompanying drawing, wherein:

FIG. 1 is a longitudinal sectional view through a multi-walled pipe according to the invention;

FIG. 2 shows a detail of the pipe of FIG. 1 on a larger scale;

FIG. 3 is a longitudinal sectional view through another embodiment of a multi-walled pipe; and FIG. 4 is a longitudinal sectional view through a further embodiment of a multi-walled pipe.

For producing the corrugated pipe shown in FIG. 1 a single metal band 4 is used which is of such width that after corrugating the band material in a profiling machine the band extends across somewhat more than three entire corrugations defining three crests and two valleys. The corrugated metal band 4 is spirally wound on a mandrel, not shown, so that always more than one corrugation of successive windings are overlapped. A double walled corrugated pipe having a threefold band layer at the corrugation peaks is thus produced, which peaks are welded together at 5. A welding point 5 is shown in FIG. 2 on enlarged scale. When a leak occurs at the welding point 5 of FIG. 2, no direct connection exists from the inside of the corrugated pipe to the outside thereof. This constitutes a substantial advantage. When, for example, a resistance welding method is applied in which the weld consists of individual more or less overlapping points, then it may happen that the overlapping on one point is not satisfactory and a leakage forms. At the welding point according to FIG. 2 there will be only produced a connection from the outside or inside of the pipe until the interspace between the two walls. Since such leaks mostly are extremely small, it may suffice when a certain counter-pressure is present between the layers, whereby any further penetration, for example of pressure medium from the interior of the corrugated pipe into the interspace, will be prevented, and the outermost layer at this point is not yet exposed to the full interior pressure, so that the corrugated pipe still remains tight. This property represents a safety factor and makes the corrugated pipe particularly suitable, for example in aircraft construction, in the atomic energy industry, etc. where safety is of great importance. Moreover, as will be understood, the entire pressure must not be transmitted through the weld, since a throughgoing intermediate layer is present on each welding point. This fact is of particular importance also in case of vibrational stress which is magnified at the welding point due to stress concentration. As is evident from FIG. 2, deflection takes place at this welding point gradually so that stress peaks of relatively low magnitude will occur at the welding point of FIG. 2. The weld which represents the weakest zone will thus be subjected to lower stress because of the continuous intermediate layer.

In place of resistance welding other welding methods may also be employed, for example welding by means of local induction heating or by high frequency.

FIG. 3 shows a corrugated pipe in which instead of welding, a soldering operation takes place. In winding the corrugated metal band 6, soldering material 7, preferably in the form of a wire, is simultaneously wound about the top of the corrugations between the intermediate and the inner and outer layers. The wire is accommodated in a small depressed portion 10 in the top of the corrugations. By applying heat, the solder melts and an absolutely tight corrugated pipe is produced. The heating operation may take place either continuously, concurrently with the winding operation, or only after the winding of a length of pipe has been completed. It can be effected in various ways, for example by electric resistance heating, by induction heating, by means of a gas flame, etc.

The production of a triple walled corrugated pipe is illustrated in FIG. 4. In this case the width of the corrugated metal band 8 extends across somewhat more than four corrugations and the band is spirally wound on a mandrel, not shown, so that it overlaps itself by more than two corrugations. Four layers of band material are superposed at the points 9 to be welded. In the corrugated pipe according to FIG. 4, double continuous layers are obtained at the welding point at the crest of the corrugations, whereby the margin of safety of the tube at the overlapped corrugation is additionally increased in case of an insufficiently formed welding point. The vibration stability is also improved, since the peaks of stress can be still further reduced in this case. Corrugated pipes having more than three walls may also be produced in similar manner.

I claim:

A method of producing a multiple wall-thickness corrugated tube from a corrugated band of single thickness, said method comprising forming a single elongated metal band having at least three longitudinal corrugations therein constituted by three crests and two valleys, winding said corrugated band spirally at a pitch equal to the width of one corrugation of said band to cause said band to successively overlap itself over at least two corrugations and form a cylindrical tube with valleys having at least two continuous thicknesses of material and crests having three thicknesses of material constituted by a single continuous thickness of material and two thicknesses of material constituted by overlapped free edges of the strip, and welding the overlapped thickness of material together spirally and continuously only along the crests of the tube while leaving the overlapped thickness of material free and independent in the valleys.

References Cited in the file of this patent

UNITED STATES PATENTS

| | | |
|---|---|---|
| 1,459,487 | Witzezenmann | June 19, 1923 |
| 1,964,289 | Harrah | June 26, 1934 |
| 2,008,077 | Livesay | July 16, 1935 |
| 2,158,796 | Harrah | May 16, 1939 |
| 2,288,094 | Karmazin | June 30, 1942 |
| 2,314,611 | Dreyer | Mar. 23, 1943 |
| 2,392,194 | Seymour | Jan. 1, 1946 |
| 2,490,513 | Dreyer | Dec. 6, 1949 |
| 2,876,801 | November | Mar. 10, 1959 |

FOREIGN PATENTS

| | | |
|---|---|---|
| 143,914 | Australia | Oct. 24, 1951 |
| 747,029 | France | Dec. 7, 1932 |